United States Patent
Wang et al.

(10) Patent No.: US 6,926,612 B2
(45) Date of Patent: Aug. 9, 2005

(54) JOINT ASSEMBLY AND SEALING BOOT

(75) Inventors: Shen-Ling Allen Wang, Northville, MI (US); Paul Anthony Fanara, Fraser, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 10/654,789

(22) Filed: Sep. 4, 2003

(65) Prior Publication Data

US 2005/0054452 A1    Mar. 10, 2005

(51) Int. Cl.$^7$ .............................................. F16D 3/84
(52) U.S. Cl. ...................... 464/173; 464/170; 464/175
(58) Field of Search ................................ 464/173, 175, 464/170

(56) References Cited

U.S. PATENT DOCUMENTS

| | | | | |
|---|---|---|---|---|
| 3,490,343 A | * | 1/1970 | Afanador et al. | ........... 464/175 |
| 3,822,570 A | * | 7/1974 | Fisher | ......................... 464/173 |
| 4,224,808 A | * | 9/1980 | Gehrke | ......................... 464/175 |
| 4,304,416 A | * | 12/1981 | Oshima | ....................... 464/173 |
| 5,707,066 A | * | 1/1998 | Sugiura et al. | ............. 464/175 |
| 6,093,108 A | * | 7/2000 | Moulinet | ..................... 464/173 |
| 6,264,568 B1 | * | 7/2001 | Frazer et al. | ................ 464/173 |

OTHER PUBLICATIONS

PCT Notification of Transmittal of the International Search Report and the Written Opinion of the International Searching Authority, Dec. 22, 2004, 3 pages.
PCT International Search Report by the International Searching Authority of the European Patent Office, Dec. 22, 2004, 4 pages.
PCT Written Opinion of the International Searching Authority of the European Patent Office, Dec. 22, 2004, 5 pages.

* cited by examiner

Primary Examiner—Aaron Dunwoody
(74) Attorney, Agent, or Firm—Jennifer M. Brumbaugh; Mick A. Nylander

(57) ABSTRACT

A joint sealing boot comprises a first end affixable to a shaft, and a second end affixable to a boot cover, the second end having a sealing area including at least one sealing bead for sealing the joint and preventing grease egress and contamination ingress.

12 Claims, 5 Drawing Sheets

JOINT ASSEMBLY AND SEALING BOOT

TECHNICAL FIELD

The present invention relates to an improved sealing solution for a propshaft joint boot.

BACKGROUND ART

There are generally four (4) main types of automotive drive line systems. More specifically, there exists a full-time front wheel drive system, a full-time rear wheel drive system, a part-time four wheel drive system, and an all-wheel drive system. Most commonly, the systems are distinguished by the delivery of power to different combinations of drive wheels, i.e., front drive wheels, rear drive wheels or some combination thereof. In addition to delivering power to a particular combination of drive wheels, most drive systems permit the respectively driven wheels to rotate at different speeds. For example, the outside wheels may rotate faster than the inside drive wheels, and the front drive wheels normally rotate faster than the rear wheels.

Drive line systems also include one or more constant velocity universal joints (e.g. plunging tripod, plunging cross groove, high speed fixed joint, etc.) where transmission of a constant velocity rotary motion is desired or required. Such joints, and their operation, are well known to those skilled in the art. Accordingly, they will be discussed only briefly below.

A plunging tripod type constant velocity universal joint is characterized by the performance of end motion in the joint. Plunging tripod joints are currently the most widely used inboard (transmission side) joint in front wheel drive vehicles, and particularly in the propeller shafts found in rear wheel drive, all-wheel drive and four-wheel drive vehicles. Plunging tripod universal joints allow their respective interconnection shafts to change length during operation without the use of splines which provoke significant reaction forces thereby resulting in a source of vibration and noise.

Another common type of constant velocity universal joint is the plunging VL or "cross groove" type, which consists of an outer and inner race drivably connected through balls located in circumferentially spaced straight or helical grooves alternately inclined relative to a rotational axis. The balls are positioned in a constant velocity plane by an intersecting groove relationship and maintained in this plane by a cage located between the two races. The joint permits axial movement since the cage is not positionably engaged to either race. As those skilled in the art will recognize, the principal advantage of this type of joint is its ability to transmit constant velocity and simultaneously accommodate axial motion. Plunging VL constant velocity universal joints are currently used for high speed applications such as, for example, the propeller shafts found in rear wheel drive, all-wheel drive and four-wheel drive vehicles.

The high speed fixed joint (HSFJ) is another type of constant velocity joint well known in the art and used where transmission of high speed is required. High speed fixed joints allow articulation to an angle (no plunge) but can accommodate much higher angles than with a Cardan joint or other non-CV joints such as, for example, rubber couplings. There are generally three types of high speed fixed joints: (1) disk style that bolts to flanges; (2) monoblock style that is affixed to the tube as a center joint in multi-piece propshafts; and (3) plug-on monoblock that interfaces directly to the axle or T-case replacing the flange and bolts.

A typical driveline system incorporates one or more of the above joints in an all wheel drive or traditional four wheel drive system. In an all wheel drive system, such joints are used to connect a pair of propeller shafts (front and rear) (also called a propeller shaft assembly) to a power take off unit and a rear driveline module, respectively. These propeller shafts ("propshafts") function to transfer torque to the rear axle in rear wheel and all wheel drive vehicles. Similarly, in a traditional four wheel drive system, such joints are used to connect the propeller shaft between a transfer case and the front axle.

Most constant velocity universal joints are sealed in order to retain grease inside the joint while keeping contaminants and foreign matter, such as dirt, water, and the like out of the joint. In order to achieve this protection, the constant velocity joint is usually enclosed at the open end of the outer race by a sealing boot made of rubber, thermoplastic or urethane. The opposite end of the outer race is sometimes formed by an enclosed dome known in the art as a "grease cap." Such sealing and protection of the constant velocity joint is necessary because, once the inner chamber of the outer joint is partially filled and thus lubricated, it is generally lubricated for life. Prior art seals may have imperfections between the cover and boot which may lead to leakage or contamination.

Therefore, there is a need in the art for a boot that will ensure the joint chamber is properly and effectively sealed from ingress of contaminates and leakage of lubricating grease from the joint.

DISCLOSURE OF THE INVENTION

It is an object of the present invention to provide a joint and shaft assembly having improved sealing means.

It is another object of the present invention to provide a seal between the boot and cover at the crimping area.

It is yet another object of the present invention to provide an improved boot having a bead design at the crimping area.

In carrying out the above objects, there is provided a joint sealing boot having a first end affixable to a shaft and a second end affixable to a boot cover. The second end further includes at least one and preferably two deformable sealing members such as beads for sealing the joint and preventing grease egress and contamination ingress.

One advantage of the present invention is an improved boot for use in a joint.

Another advantage of the present invention is a bead design on a boot for use in a joint.

Still another advantage of the present invention is the ability to have a proper seal between a boot and cover that may have imperfections.

Other objects, features and advantages of the present invention will become apparent from the subsequent description and the appended claims, taken in conjunction with the accompanying drawings.

BRIEF DESCRPTION OF THE DRAWINGS

BEST MODE FOR CARRYING OUT THE INVENTION

Figure 1:
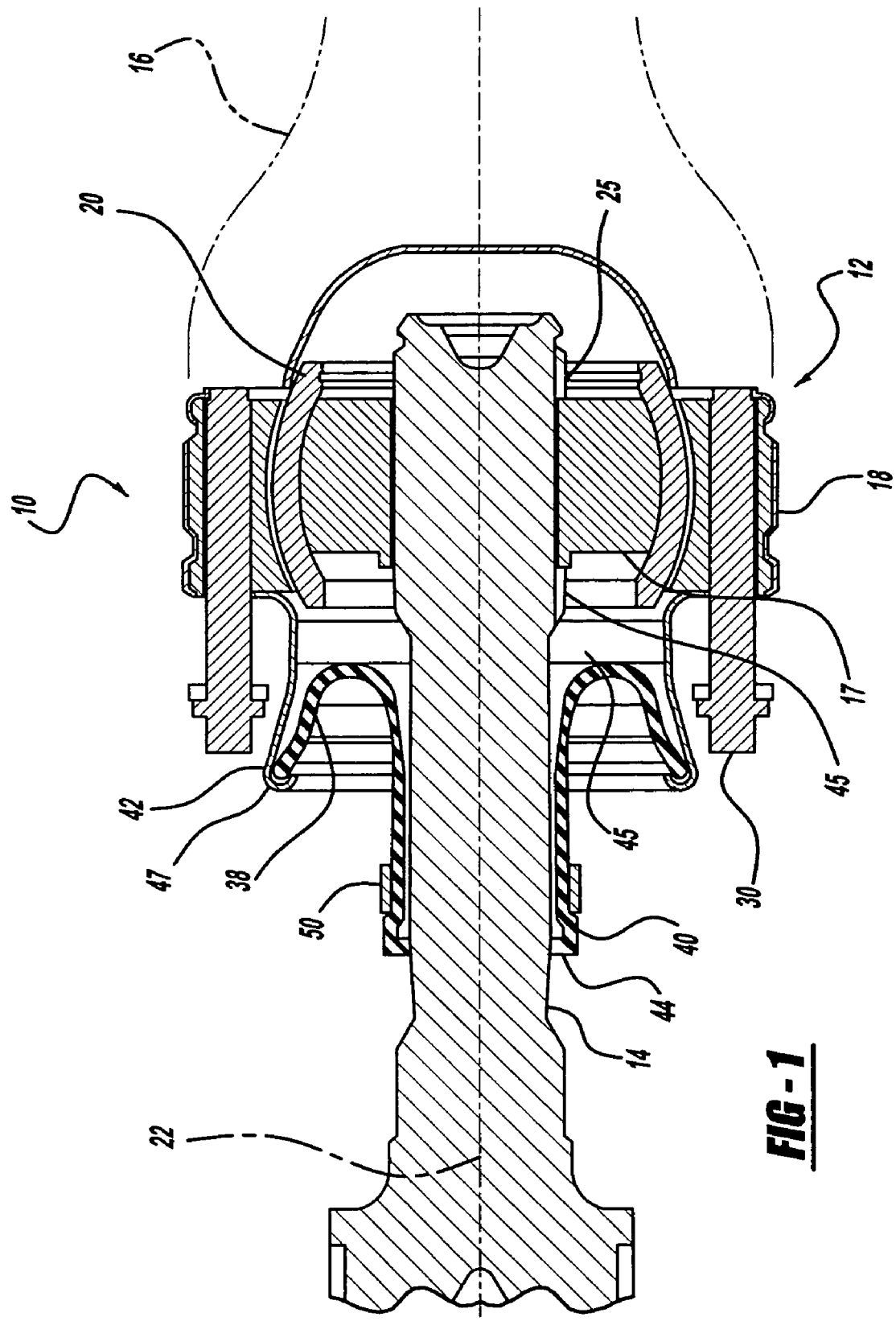
FIG. 1 is a cross-sectional view of the sealing boot of the present invention shown affixed to a constant velocity joint.

Referring to the figures, there is shown a constant velocity joint and shaft assembly 10 according to the invention. The assembly 10 includes a constant velocity joint 12 for transmitting torque between a first shaft 14 and another component such as a second shaft 16. One of the shafts 14 or 16 may be a drive shaft such as a propeller shaft. It should be noted that shafts 14 or 16 may also be side shafts in other contemplated embodiments. The joint 12 includes a first joint part such as an inner race 17, a second joint part such as an outer race 18, and a ball cage 20 disposed in an annular space between the races 17 and 18. While the joint 12 is configured to operate through a wide range of angles, FIG. 1 shows the races 17 and 18 and ball cage 20 aligned along a common central axis 22.

Figure 2:
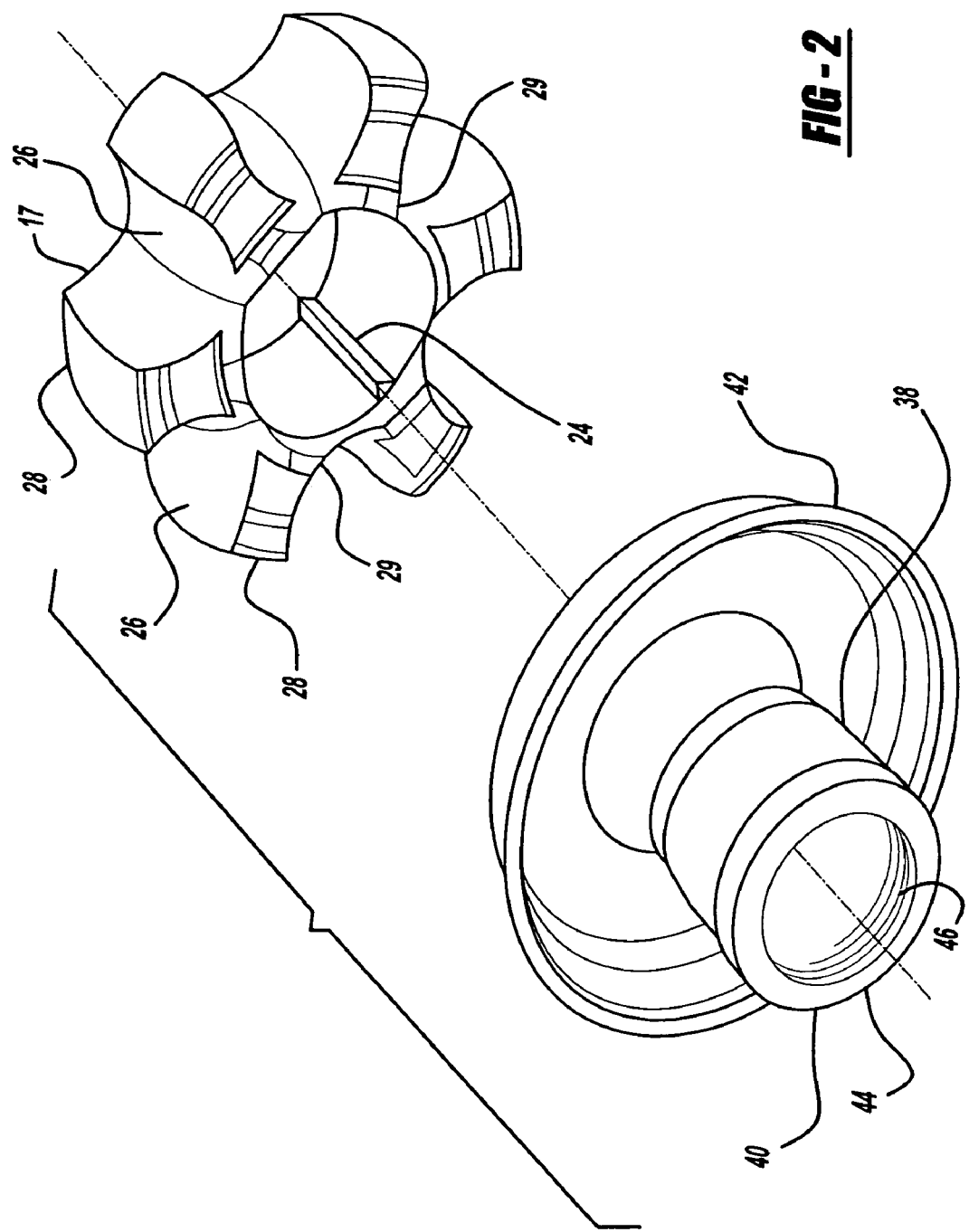
FIG. 2 is an exploded perspective view of the sealing boot of FIG. 1 and an inner race of the constant velocity joint.
Figure 3:
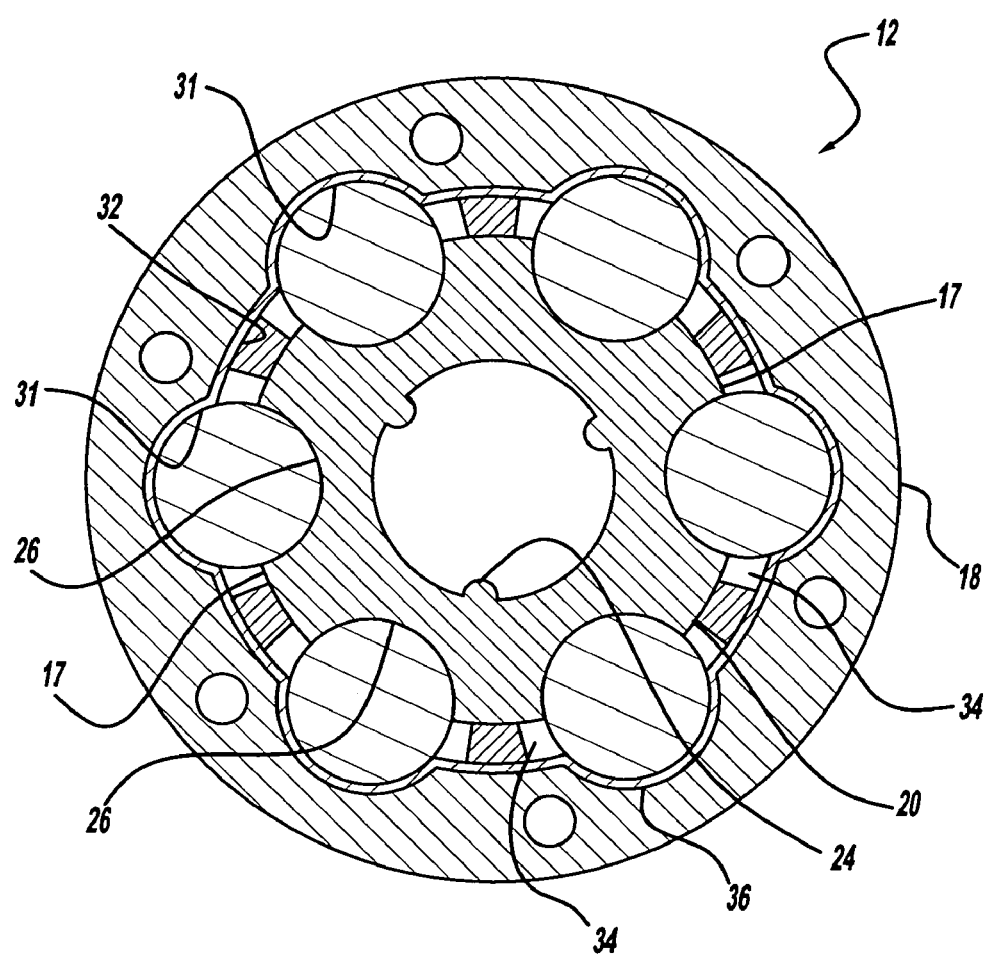
FIG. 3 is a cross sectional view of the constant velocity joint of FIGS. 1 and 2.
Figures 4, 5:
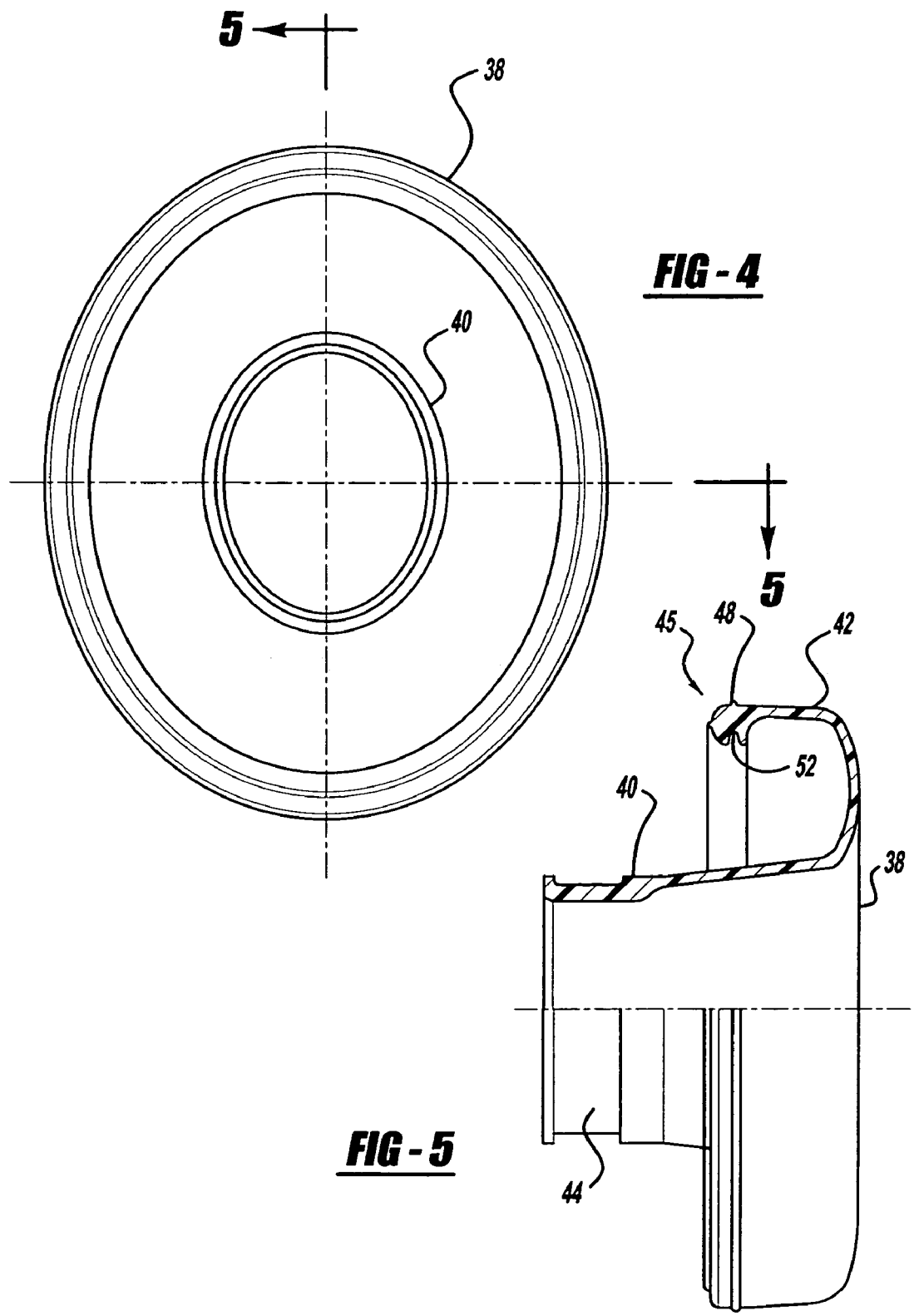
FIG. 4 is a top plan view of the sealing boot of the present invention.
FIG. 5 is a cross sectional view of the sealing boot of the present invention taken along line 5—5 of FIG. 4.
Figure 6:
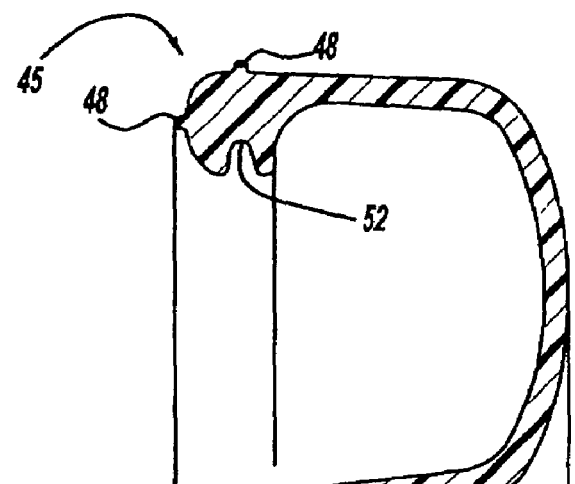
FIGS. 6–8 are enlarged partial cross sectional views of the sealing boot of the present invention illustrating the sealing beads in further detail.
Figure 7:
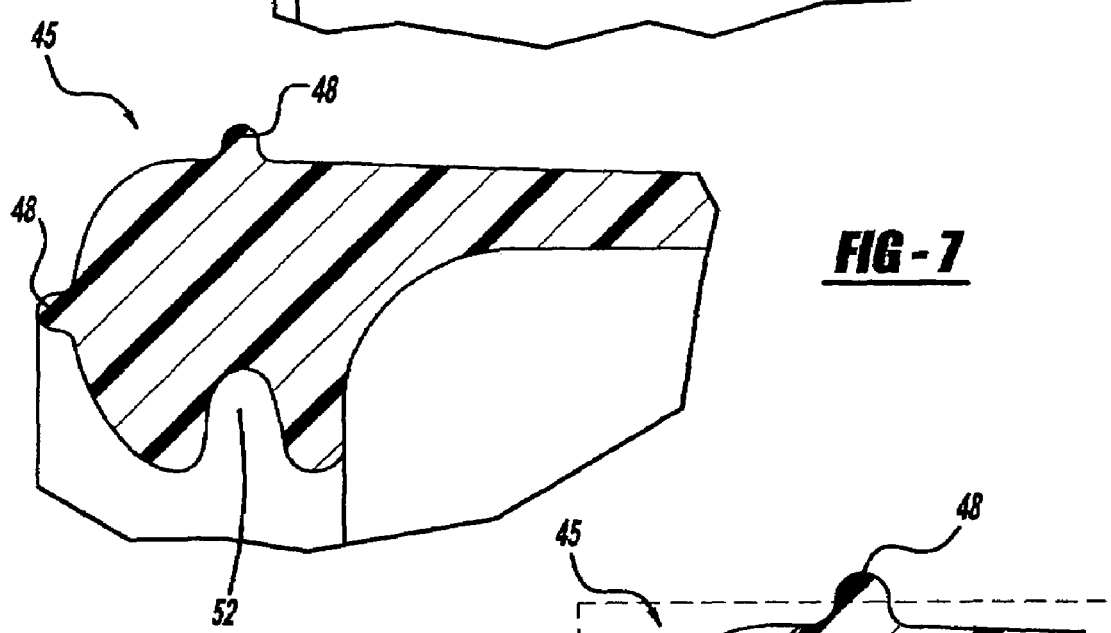
Figure 8:
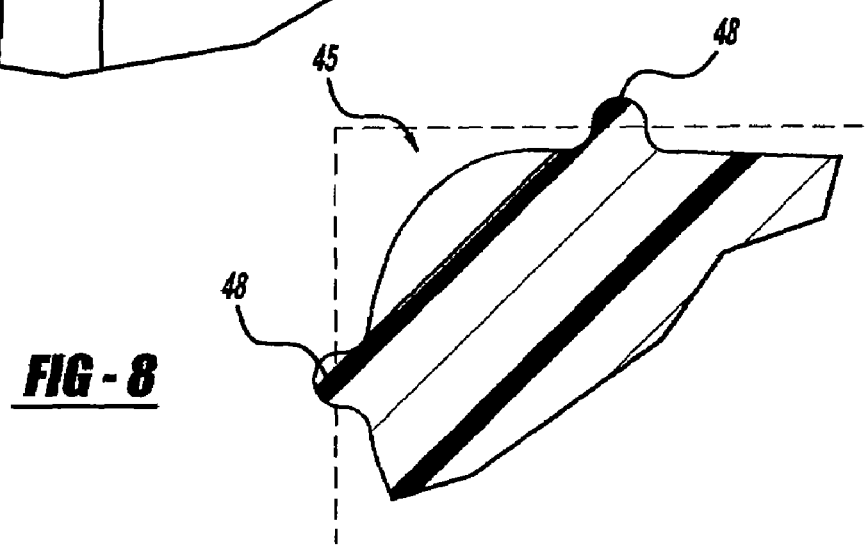

As shown more particularly in FIGS. 2–3, the inner race 17 is slidably connected to the first shaft 14 in any suitable manner. For example, the inner race 17 may be provided with a splined opening 24 that mates with a splined outer surface 25 of the first shaft 14. With such a configuration, the inner race 17 may rotate with the first shaft 14, and may also move axially along the first shaft 14. The inner race 17 also has a plurality of first tracks 26.

The outer race 18 is connected to the second shaft 16 in any suitable manner, such as with fasteners 30, welding, or any other known fastening means. Alternatively, the outer race 18 and the second shaft 16 may be formed as a single component. The outer race 18 includes a plurality of second tracks 31.

The ball cage 20 has a plurality of circumferentially distributed windows 34 for retaining a plurality of torque-transmitting balls 36. Each ball 36 is engageable with a pair of first and second tracks 26 and 31, respectively, for transmitting torque between the inner and outer races 17 and 18 respectively.

The boot 38 has first and second sections 40 and 42, respectively. The boot 38 preferably has a seal, such as a radially extending annular portion 44, that is configured to retain lubrication within the assembly 10. Preferably, but not necessarily, the annular portion 44 is provided with a plurality of annular ridges 46. The section 40 of the boot 38 is held against the shaft 14 by a clamp or other fastener 50.

The second section of the boot 42 is connected directly or indirectly to the outer race 18. For example, the second end 42 may be connected to a boot cover or can 47 that is attached to the outer race 18 in any suitable manner. In one embodiment the can 47 is crimped around one edge of the boot 38.

The boot 38 may comprise any suitable material that is sufficiently flexible to allow the joint 12 to operate through a wide range of angles. Suitable materials include thermoplastic rubber, silicone, plastic material and urethane, etc. Advantageously, thermoplastic, rubber and silicone also provide good sealing properties for the annular portion 44.

As shown in more detail in FIGS. 4–8, boot 38 and more particularly boot second end 42, further includes a deformable sealing solution having in one embodiment contemplated the form of an annular lip or crimping/sealing area 45 at the end of the boot 38. This sealing area 45 will prevent the joint chamber from being contaminated by dirt, water, road grime, etc, and lubricant from leaking from within the joint. More specifically, end 42 includes at least one and preferably a pair of sealing beads 48. In one embodiment the sealing beads 48 generally have a round or circular shape. The sealing beads 48 may be deformed i.e., "crimped" or otherwise compressed to more tightly seal boot end 42 and thus boot 38 to the boot cover 47. In one contemplated embodiment as shown in the drawings a first bead 38 extends from the end of sealing area 45 generally parallel to the shaft 14. A second sealing bead 48 is located on an outer surface of the sealing area 45 at an approximate 90° angle from the other bead 48. The sealing area 45 also includes an annular channel 52 located on an inner surface of the sealing area 45. The above described sealing solution may, of course, includes any number, shape, size, composition, and placement of sealing beads 48 or other suitable sealing means depending only on the desired application and result. In the preferred embodiment shown in FIGS. 4–8, for example, a pair of substantially rounded beads 48 comprised of a flexible material are included. Beads 48 may, however, comprise any suitable natural or synthetic material or combination thereof. The beads are generally molded into the boot 38 but it is contemplated to attach the beads after the molding process.

In operation the boot 38 will be secured between the boot can 47 and the shaft 14. The connection between the boot 38 and the boot can 47 is generally accomplished by crimping the edge of the can 47 around the sealing area 45 of the boot 38. In many prior art boot cover to boot connections imperfections in the contact surfaces between the boot and can would leave gaps in the seal thus creating an entry or exit point for the propshaft or halfshaft joint. This would allow for possible contamination of the joint or loss of lubricant, thus reducing the life of the joint. The present invention having the novel bead design will aid in ensuring the sealing of the crimping area between the boot 38 and cover 47. The beads 48 will prevent any surface imperfections between the boot 38 and cover 47 from creating any entry or exit point into or out of the joint. The sealing beads 48 will ensure any gap between the can 47 and the boot 38 is properly sealed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A boot for use on a vehicle joint, said boot comprising:
a body;
a first end of said body having a tubular shape; and
a second end of said body having a sealing area, said sealing area having a first end surface with at least one sealing bead and a second end surface with at least one sealing bead;
wherein said second end surface is generally orthogonal to said first end surface.

2. The boot of claim 1 further including an annular channel on an inside surface of said sealing area.

3. The boot of claim 1 wherein the boot is made of a flexible material.

4. The boot of claim 3 wherein said flexible material is a thermoplastic.

5. A constant velocity joint assembly for a vehicle, said assembly comprising:

a shaft;

a first joint part connected to said shaft;

a second joint part cooperable with said first joint part to transmit torque therebetween;

a boot having a first end contacting said shaft and a second end associated with said second joint part, said second end having a sealing area including a first end surface with at least one sealing bead and a second end surface with at least one sealing bead, wherein said second end surface is generally orthogonal to said first end surface; and a boot cover having a first end affixable to said second joint part and a second end affixable to said second end of said boot and contacting the sealing beads of said first end surface and said second end surface of said sealing area of said second end of said boot.

6. The assembly of claim 5 wherein said boot cover is affixable to said second end of said boot by a crimping operation on at least one of said sealing beads.

7. The assembly of claim 5 further including an annular channel on an inside surface of said sealing area.

8. A joint assembly, said assembly including:

a shaft;

a first joint part connected to said shaft;

a second joint part cooperable with said first joint part to transmit torque therebetween;

a boot having a first end contacting said shaft and a second end associated with said second joint part, said second end having a sealing area including a plurality of sealing beads wherein at least one of said plurality of sealing beads is located on first end surface of said sealing area and a second of said plurality of sealing beads is located on a second end surface, wherein said second end surface is generally orthogonal to said first end surface; and a boot cover having a first end and a second end, said first end of said boot cover affixable to said second joint part and said second end of said boot cover affixable to said second end of said boot by a crimping operation between said plurality of sealing beads and said second end of said boot cover.

9. The assembly of claim 8 further including an annular channel on an inside surface of said sealing area.

10. A boot for use between a shaft and a joint, said boot comprising:

a first end contacting the shaft; and a second end having a sealing area, said sealing area having a plurality of sealing beads wherein one of said sealing beads is located on a first end surface of said sealing area and a second of said sealing beads is located on a second end surface of said sealing area, wherein said second end surface is generally orthogonal to said first end surface, said second end be affixable to the joint by performing a crimping operation between said sealing beads and the joint.

11. A method for connecting a first and second joint part of a constant velocity joint, said method comprising the steps of:

providing a boot having a first end affixable to a shaft and a second end associated with said second joint part, said second end having a sealing area including at least one sealing bead located on a first end surface of said sealing area and at least one sealing bead located on a second end surface, wherein said second end surface is generally orhogonal to said first end surface;

providing a boot cover having a first end and a second end;

affixing said first end of said boot cover to said second joint part; and affixing said second end of said boot cover to said second end of said boot by performing a crimping operation on the sealing beads of said first and second end surfaces of said sealing area.

12. A method for connecting first and second joint parts of a constant velocity joint, said method including the steps of:

providing a boot having a first end affixable to a shaft and a second end associated with the second joint part, said second end having a sealing area including a plurality of sealing beads wherein at least one of said sealing beads is located on a first end surface of said sealing area and at least one of said sealing beads is located on a second end surface of said sealing area, wherein said second end surface is generally orthogonal to said first end surface;

providing a boot cover having a first end and a second end;

affixing said first end of said boot cover to the second joint part; and affixing said second end of said boot cover to said second end of said boot by performing a crimping operation on said plurality of sealing beads.

* * * * *